United States Patent
Almog et al.

(10) Patent No.: US 11,662,324 B1
(45) Date of Patent: May 30, 2023

(54) THREE-DIMENSIONAL SURFACE METROLOGY OF WAFERS

(71) Applicant: Applied Materials Israel Ltd., Rehovot (IL)

(72) Inventors: Ido Almog, Rehovot (IL); Ron Bar-Or, Rehovot (IL); Lior Yaron, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 0 days.

(21) Appl. No.: 17/698,393

(22) Filed: Mar. 18, 2022

(51) Int. Cl.
*G01N 23/22* (2018.01)
*G01Q 60/24* (2010.01)
*G01N 23/2251* (2018.01)

(52) U.S. Cl.
CPC ......... *G01N 23/2251* (2013.01); *G01Q 60/24* (2013.01); *G01N 2223/07* (2013.01); *G01N 2223/418* (2013.01); *G01N 2223/507* (2013.01); *G01N 2223/6116* (2013.01)

(58) Field of Classification Search
CPC .......... G01N 23/2251; G01N 2223/07; G01N 2223/418; G01N 2223/507; G01N 2223/6116; G01Q 60/24
See application file for complete search history.

(56) References Cited

U.S. PATENT DOCUMENTS

| | | |
|---|---|---|
| 5,155,359 A | 10/1992 | Monahan |
| 9,262,819 B1 | 2/2016 | Kagalwala et al. |
| 10,664,638 B1 | 5/2020 | Kagalwala et al. |
| 2002/0176074 A1 | 11/2002 | Hasan |
| 2010/0294927 A1 | 11/2010 | Nelson et al. |
| 2012/0098974 A1* | 4/2012 | Lenhert ............... G01N 21/278 348/180 |
| 2015/0309071 A1* | 10/2015 | Proksch ............... G01Q 10/04 850/1 |
| 2021/0125809 A1 | 4/2021 | Sun et al. |

FOREIGN PATENT DOCUMENTS

| | | |
|---|---|---|
| CN | 110155959 A | 8/2019 |
| CN | 113279058 A | 8/2021 |
| KR | 20070032479 A | 3/2007 |
| RU | 2660418 C1 | 7/2018 |

* cited by examiner

*Primary Examiner* — Nicole M Ippolito
(74) *Attorney, Agent, or Firm* — Kilpatrick Townsend & Stockton LLP

(57) ABSTRACT

A computer-based method for three-dimensional surface metrology of samples based on scanning electron microscopy and atomic force microscopy. The method includes: (i) using a scanning electron microscope (SEM) to obtain SEM data of a set of sites on a surface of a sample; (ii) using an atomic force microscope (AFM) to measure vertical parameters of sites in a calibration subset of the set; (iii) calibrating an algorithm, configured to estimate a vertical parameter of a site when SEM data of the site are fed as inputs, by determining free parameters of the algorithm, such that residuals between the algorithm-estimated vertical parameters and the AFM-measured vertical parameters are about minimized; and (iv) using the calibrated algorithm to estimate vertical parameters of the sites in the complement to the calibration subset.

20 Claims, 5 Drawing Sheets

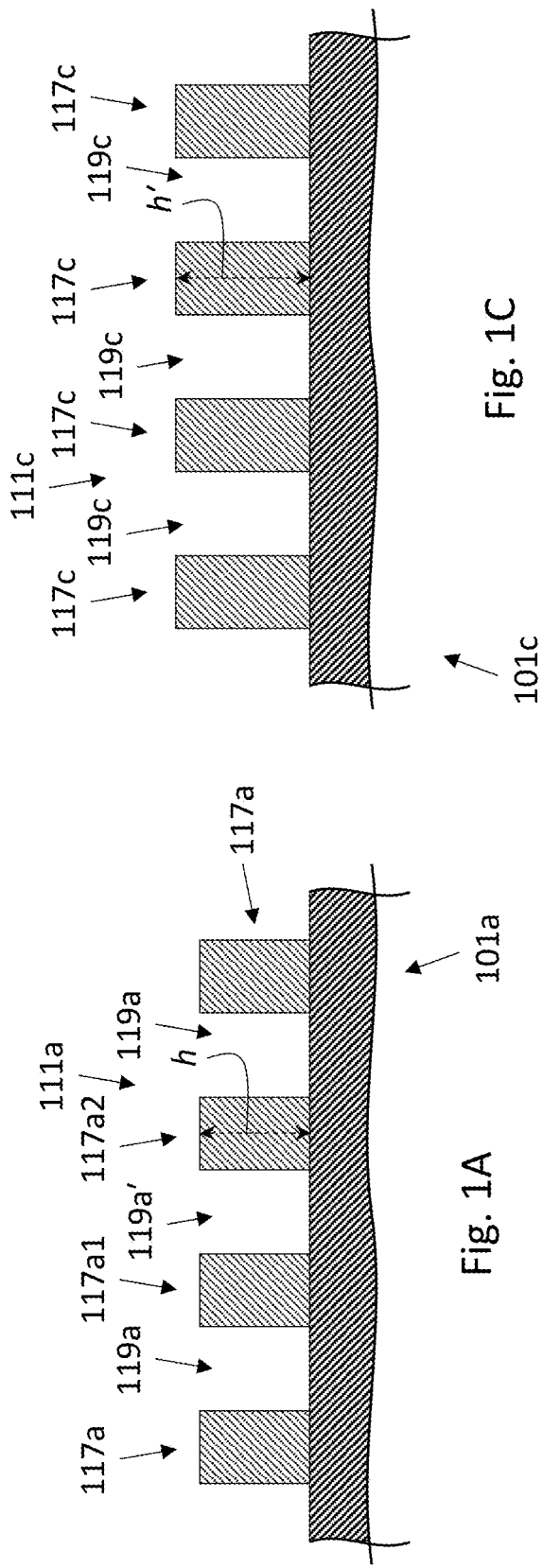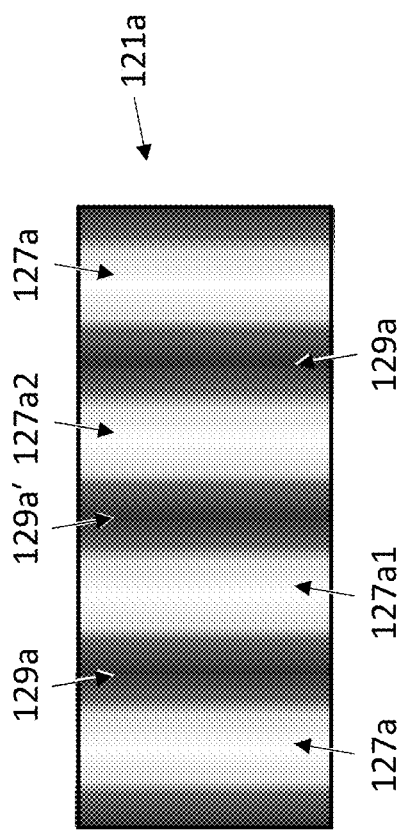

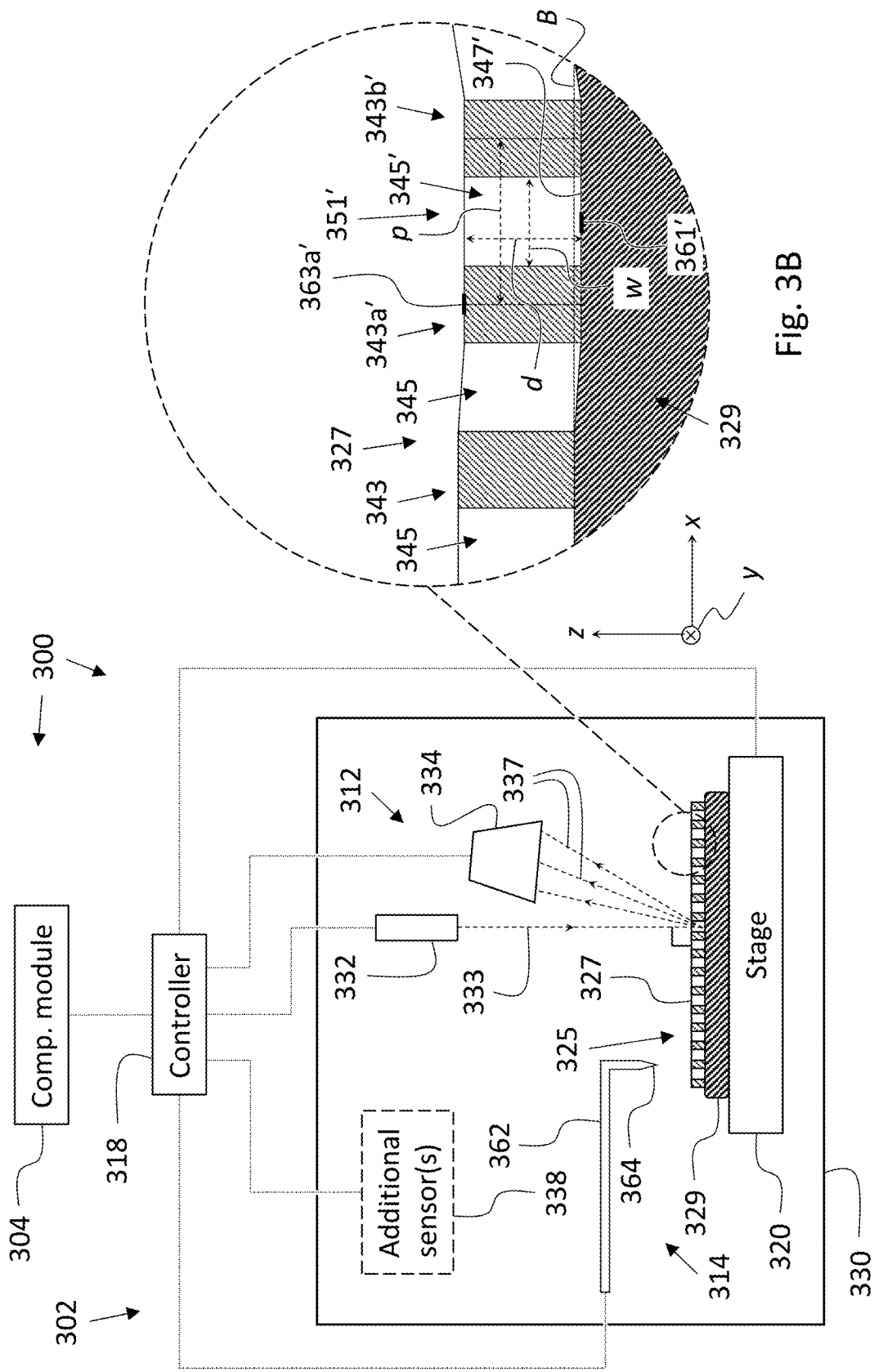

THREE-DIMENSIONAL SURFACE METROLOGY OF WAFERS

TECHNICAL FIELD

The present disclosure relates generally to three-dimensional surface metrology of specimens.

BACKGROUND OF THE INVENTION

A key challenge in process control of patterned wafers is three-dimensional surface metrology; that is, the mapping of the topography of structures on a surface of a patterned wafer. With the shrinking of design rules, this task grows ever more complex as increasingly greater precision is required. Ideally, the increase in precision should not come at the expense of throughput. State-of-the-art techniques for three-dimensional surface metrology of patterned wafers include optical-based techniques, scanning electron microscopy-based techniques, transmission electron microscopy-based techniques, and atomic force microscopy-based techniques. Each of these techniques has its own advantages and disadvantages. There remains an unmet need in the art for non-destructive techniques for three-dimensional surface metrology of patterned wafers, which are both fast and accurate.

BRIEF SUMMARY OF THE INVENTION

Aspects of the disclosure, according to some embodiments thereof, relate to three-dimensional surface metrology. More specifically, but not exclusively, aspects of the disclosure, according to some embodiments thereof, relate to three-dimensional surface metrology of wafers combining scanning electron microscope (SEM) and atomic force microscope (AFM) measurements.

Thus, according to an aspect of some embodiments, there is provided a computer-based method for three-dimensional surface metrology of specimens based on scanning electron microscopy and atomic force microscopy. The method includes operations of:
- Using a scanning electron microscope (SEM) to obtain SEM data of a set of sites on a surface of an inspected specimen.
- Using an atomic force microscope (AFM) to measure vertical parameters quantifying vertical coordinates and/or vertical dimensions of sites in a calibration subset of the set.
- Calibrating an algorithm, configured to estimate a vertical parameter of a site when SEM data of the site are input into the algorithm, by determining free parameters of the algorithm, such that residuals between the algorithm-estimated vertical parameters and the AFM-measured vertical parameters are about minimized.
- Using the calibrated algorithm to estimate vertical parameters of the sites in the complement (i.e. the sites in the set which are not in the calibration subset) to the calibration subset.

According to some embodiments of the metrology method, the obtained residuals are to within a required precision when satisfying a first condition that absolute values thereof are smaller than a first threshold value, and/or a second condition that a value of a precision function thereof is smaller than a second threshold value.

According to some embodiments of the metrology method, the obtained residuals are to within a required precision when a percentage above a first threshold percentage of the obtained residuals satisfy at least one of a first (or third) condition that each residual in the percentage is smaller than a first (or third) threshold value, and a second (or fourth) condition that a value of a precision function of the residuals in the percentage is smaller than a second (or fourth) threshold value. When the first condition and/or the second condition are satisfied, the calibration subset is updated to exclude sites therein, when present, which are not in the percentage satisfying the first and/or the second condition.

According to some embodiments of the metrology method, the first threshold percentage is at least about 90%.

According to some embodiments of the metrology method, the excluded sites are labelled as potentially defective.

According to some embodiments of the metrology method, when the obtained residuals are not to within the required precision, the following extra operations are performed:
- Updating the calibration subset to further include one or more extra sites from the set.
- Using the AFM to measure vertical parameters of the one or more extra sites.
- Performing the operation of calibrating the algorithm, additionally taking into account the measured vertical parameters of the one or more extra sites and SEM data of the one or more extra sites, and, once thereby obtained residuals are to within the required precision, proceeding to the operation of using the calibrated algorithm.

According to some embodiments of the metrology method, the sites in the calibration subset are selected, and profiled by the AFM, in an iterative manner, such that data obtained in one iteration are used, in a next iteration, to improve the selection of sites, so as to improve the calibration.

According to some embodiments of the metrology method, the sites in the calibration subset are selected by random sampling of the sites in the set.

According to some embodiments of the metrology method, in the operation of using the calibrated algorithm to estimate vertical parameters of the sites in the complement to the calibration subset, if a percentage above a second threshold percentage of sites in the complement is such for each site, included in the percentage of sites, a difference between the estimated vertical parameter thereof and an expected vertical parameter falls outside a predetermined range, then the calibration subset is replaced by a new calibration subset (i.e. a new calibration subset is selected), the AFM is used to measure vertical parameters of calibration sites in the new calibration subset, which have not previously been probed by the AFM, the algorithm is recalibrated (i.e. the operation of calibrating the algorithm is applied with respect to the new calibration subset), and the recalibrated algorithm is used to estimate vertical parameters of the sites in the complement to the new calibration subset.

According to some embodiments of the metrology method, the calibration subset is selected taking into account expected process variation across the inspected specimen and expected and/or known SEM drifts.

According to some embodiments of the metrology method, the calibration subset is selected taking into account past successful selections of calibration subsets at least in specimens of a same intended design as the inspected specimen and/or specimens similar thereto.

According to some embodiments of the metrology method, the calibration subset is selected taking into account past successful selections of calibration subsets in specimens from a same batch as the inspected specimen.

According to some embodiments of the metrology method, a functional form of the algorithm is selected based on the number of sites in the calibration subset and/or accuracy of the AFM measurements.

According to some embodiments of the metrology method, when the number of calibration sites is beyond a threshold number and/or the accuracy of the AFM measurements is beyond a threshold accuracy, a greater a number of functional forms of the algorithm available for selection.

According to some embodiments of the metrology method, at least some of the functional forms, available for selection only if the number of calibration sites is beyond the threshold number and/or the accuracy of the AFM measurements is beyond the threshold accuracy, are characterized by a comparatively greater number of free parameters.

According to some embodiments of the metrology method, the SEM data include raw SEM data and/or processed SEM data.

According to some embodiments of the metrology method, the SEM data include at least secondary electron signals and/or backscattered electron signals.

According to some embodiments of the metrology method, the secondary electron signals include intensities of the secondary electrons, and/or the backscattered electron signals include intensities of the backscattered electrons.

According to some embodiments of the metrology method, the SEM data specify a collection angle of the secondary electrons and/or the backscattered electrons.

According to some embodiments of the metrology method, the inputs further include an incidence angle of an electron beam of the SEM and/or an intensity thereof.

According to some embodiments of the metrology method, the SEM data further include one or more of X-ray signals, cathodoluminescent light signals, and absorbed current signal.

According to some embodiments of the metrology method, the number of free parameters of the algorithm is smaller than the number of sites in the calibration subset.

According to some embodiments of the metrology method, the output of the algorithm is a polynomial function of the SEM data.

According to some embodiments of the metrology method, machine learning tools are used to determine the free parameters of the algorithm.

According to some embodiments of the metrology method, the algorithm is a deep neural network and the free parameters include weights of the deep neural network.

According to some embodiments of the metrology method, regression analysis is used to determine the free parameters of the algorithm.

According to some embodiments of the metrology method, when a sum of squares corresponding to the obtained residuals is about minimized, the obtained residuals are to within the required precision.

According to some embodiments of the metrology method, the calibration subset is at least about one order of magnitude smaller than the set.

According to some embodiments of the metrology method, at least one of the free parameters has a range thereof bounded.

According to some embodiments of the metrology method, the algorithm depends on reference data of the inspected specimen.

According to some embodiments of the metrology method, the reference data include: (i) design data of the inspected specimen, (ii) SEM data, and/or AFM-measured vertical parameters, of sites on one or more specimens manufactured to the same design as the inspected specimen and/or specimens similar thereto, and/or (iii) one or more previously-obtained algorithms configured to estimate a vertical parameter of a site when SEM data of the site are input thereinto. The previously-obtained algorithms pertain to one or more specimens manufactured to the same design as the inspected specimen and/or specimens similar thereto.

According to some embodiments of the metrology method, the inspected specimen is a patterned wafer.

According to some embodiments of the metrology method, the sites include trenches between fins and/or wherein the sites include vias.

According to some embodiments of the metrology method, the algorithm is configured to receive as inputs relative intensities between bright stripes and dark stripes on a sensor image, obtained from sensing secondary electrons and/or backscattered electrons. The bright stripes correspond to the fins and the dark stripes correspond to trenches.

According to some embodiments of the metrology method, the method further includes estimating at least from the SEM data one or more critical dimensions for each site in the set, in addition to the vertical parameters thereof.

According to some embodiments of the metrology method, the inputs of the algorithm include the critical dimensions and/or one or more functions thereof.

According to some embodiments of the metrology method, the inspected specimen is a patterned wafer. At least some of the sites include a trench between fins. Per each of the sites, which includes a trench between fins, the additional critical dimensions associated therewith include a width of a trench and/or a pitch of the fins.

According to some embodiments of the metrology method, sites having anomalous, or sufficiently anomalous, critical dimensions are labelled as potentially defective.

According to an aspect of some embodiments, there is provided a computer-based method for three-dimensional metrology of surfaces of a plurality of specimens fabricated to the same design. The method includes operations of:

Applying a method for computer-based method for three-dimensional surface metrology of specimens, according to any one of the embodiments described above, to a sample of the specimens (i.e. one or more of the specimens), thereby obtaining one or more calibrated algorithms, respectively.

Using a SEM to obtain SEM data of sites on surfaces on each of the rest of the specimens.

Using the one or more calibrated algorithms to estimate vertical parameters of each of the sites in the rest of the specimens.

According to some embodiments of the last described aspect, the sample of specimens includes a first specimen in the batch and (k·m+1)-th specimens in the batch k≥2 and m≤M are integers k·M+1<N, with N being the total number of specimens in the batch.

According to an aspect of some embodiments, there is provided a computer-based method for training an algorithm for scanning electron microscope (SEM) and atomic force microscope (AFM) based three-dimensional surface metrology of specimens. The method includes operations of:

Collecting data of a plurality of specimens by, for each specimen in the plurality:

Using a SEM to obtain SEM data of sites on a surface of the specimen; and

Using an AFM to measure vertical parameters of the sites.

Using machine learning tools to determine a functional form of an algorithm configured to estimate a vertical parameter of a site when SEM data of the site input thereinto.

According to some embodiments of the training method, the plurality of specimens includes specimens of different design.

According to an aspect of some embodiments, there is provided a system for three-dimensional surface metrology of specimens. The system includes:

Scanning equipment including:
  a scanning electron microscope (SEM), configured to obtain SEM data of sites in a set of sites on a surface of an inspected specimen; and
  an atomic force microscope (AFM), configured to measure vertical parameters quantifying vertical coordinates and/or vertical dimensions of sites in a calibration subset of the set.

A computational module configured to:
  calibrate an algorithm, which is configured to estimate a vertical parameter of a site when
  SEM data of the site are fed into the algorithm as inputs, by determining free parameters of the algorithm, such that residuals between the algorithm-outputted vertical parameters and the AFM-measure vertical parameters are about minimized; and
  estimate vertical parameters of the sites in the complement to the calibration subset using the calibrated algorithm;
thereby generating a topographical map of the surface of the inspected specimen.

According to some embodiments of the system, the computational module is configured to check whether the obtained residuals satisfy at least one of a first condition that absolute values thereof are smaller than a first threshold value, and a second condition that a value of a precision function thereof is smaller than a second threshold value, and, if so, categorize the obtained residuals as being to within a required precision.

According to some embodiments of the system, the computational module is configured to check whether a percentage above a first threshold percentage of the obtained residuals satisfy at least one of a first (or third) condition that each residual in the percentage is smaller than a first (or third) threshold value, and a second (or fourth) condition that a value of a precision function of the residuals in the percentage is smaller than a second (or fourth) threshold value, and, if so, update the calibration subset to exclude sites therein, when present, which are not in the percentage of residuals that satisfy at least one of the first and second conditions.

According to some embodiments of the system, the first threshold percentage is at least about 90%.

According to some embodiments of the system, the computational module is configured to label the excluded sites as potentially defective.

According to some embodiments of the system, the system is further configured to, when the obtained residuals are not to within the required precision:
  Update the calibration subset to further include one or more extra sites from the set.
  Use the AFM to measure vertical parameters of the one or more extra sites.
  Recalibrate the algorithm, additionally taking into account the vertical parameters of the one or more extra sites and SEM data of the one or more extra sites, and, once thereby obtained residuals are to within the required precision, compute vertical parameters of the sites in the complement to the calibration subset using the recalibrated algorithm.

According to some embodiments of the system, the system is configured to select, and profile using the AFM, the sites in calibration subset in an iterative manner, with data obtained in one iteration being used improve the selection of sites in a next iteration, thereby potentially improving the calibration.

According to some embodiments of the system, the scanning equipment further includes one or more optical sensors and/or an electrical current sensor. The one or more optical sensors are configured to measure X-ray signals and/or cathodoluminescent light signals generated as a result of the inspected specimen being struck by an e-beam of the SEM. The electrical current sensor (e.g. an ammeter, a multimeter) is configured to measure an electrical current generated in the inspected specimen as a result of the inspected specimen being irradiated by the e-beam of the SEM.

According to some embodiments of the system, when a percentage above a second threshold percentage of sites in the complement is such for each site, included in the percentage of sites, a difference between the estimated vertical parameter thereof and an expected vertical parameter falls outside a predetermined range, the system is configured to: (i) replace the calibration subset by a new calibration subset, (ii) probe with the AFM sites in the new calibration subset, which have not previously been probed by the AFM, (iii) recalibrate the algorithm using the new calibration subset, and (iv) estimate the vertical parameters of sites in the complement using the recalibrated algorithm.

According to some embodiments of the system, the computational module is configured to select the calibration subset taking into account expected process variation across the inspected specimen and expected and/or known SEM drifts.

According to some embodiments of the system, the computational module is configured to select the calibration subset taking into account past successful selections of calibration subsets at least in specimens having a same design as the inspected specimen and/or specimens similar thereto.

According to some embodiments of the system, the computational module is configured to select the calibration subset taking into account past successful selections of calibration subsets in specimens from a same batch as the inspected specimen.

According to some embodiments of the system, the computational module is configured to select a functional form of the algorithm based on the number of sites in the calibration subset and/or accuracy of the AFM measurements.

According to some embodiments of the system, the computational module may be configured to preprocess some or all of the SEM data prior to feeding the SEM data into the algorithm.

According to some embodiments of the system, the obtained SEM data include at least secondary electron signals and/or backscattered electron signals.

According to some embodiments of the system, the secondary electron signals include intensities of secondary electrons sensed by the SEM, and/or the backscattered electron signals include intensities of the backscattered electrons measured sensed by the SEM.

According to some embodiments of the system, the SEM data specify a collection angle of the secondary electrons and/or the backscattered electrons.

According to some embodiments of the system, the inputs to the computational module further include an incidence angle of an electron beam of the SEM and/or an intensity thereof.

According to some embodiments of the system, the SEM data further include one or more of X-ray signals, and/or cathodoluminescent light signals, measured by the one or more optical sensors, and an absorbed current signal measured by the electric current sensor.

According to some embodiments of the system, the number of free parameters of the algorithm is smaller than the number of sites in the calibration subset.

According to some embodiments of the system, the output of the algorithm is a polynomial function of the SEM data.

According to some embodiments of the system, the computational module is configured to use machine learning tools to determine the free parameters of the algorithm.

According to some embodiments of the system, the algorithm is a deep neural network and the free parameters include weights of the deep neural network.

According to some embodiments of the system, the computational module is configured to use regression analysis to determine the free parameters of the algorithm.

According to some embodiments of the system, the computational module is configured to categorize the obtained residuals as being to within the required precision when a sum of squares corresponding to the obtained residuals is about minimized.

According to some embodiments of the system, the calibration subset is at least about one order of magnitude smaller than the set.

According to some embodiments of the system, at least one of the free parameters has a range thereof bounded.

According to some embodiments of the system, the algorithm depends on reference data of the inspected specimen.

According to some embodiments of the system, the reference data include: (i) design data of the inspected specimen, (ii) SEM data, and/or AFM-measured vertical parameters, of sites on one or more specimens manufactured to the same design as the inspected specimen and/or specimens similar thereto, and/or (iii) one or more previously-obtained algorithms configured to estimate a vertical parameter of a site when SEM data of the site are input thereinto. The one or more previously-obtained algorithms pertain to one or more specimens manufactured to the same design as the inspected specimen and/or specimens similar thereto.

According to some embodiments of the system, the inspected specimen is a patterned wafer.

According to some embodiments of the system, the sites include trenches between fins and/or the sites include vias.

According to some embodiments of the system, the computational module is configured to receive as inputs to the algorithm relative intensities between bright stripes and dark stripes on a sensor image, obtained from sensing secondary electrons and/or backscattered electrons by the SEM. The bright stripes may correspond to the fins and the dark stripes may correspond to the trenches.

According to some embodiments of the system, the computational module is further configured to estimate at least from the SEM data one or more critical dimensions for each site in the set, in addition to the vertical parameters thereof.

According to some embodiments of the system, the inputs of the algorithm include the critical dimensions and/or one or more functions thereof.

According to some embodiments of the system, the inspected specimen is a patterned wafer. At least some of the sites include a trench between fins. Per each of the sites, which includes a trench between fins, the additional critical dimensions associated therewith include a width of a trench and/or a pitch of the fins.

According to some embodiments of the system, the computational module is configured to label as potentially defective sites having anomalous, or sufficiently anomalous, critical dimensions.

According to some embodiments of the system, the system further includes a controller functionally associated with the SEM and the AFM and configured to control operation thereof.

According to an aspect of some embodiments, there is provided a computer-readable non-transitory storage medium storing instructions that cause a computational module of a system for three-dimensional surface metrology of specimens to, on receipt of scanning electron microscope (SEM) scan data of a set of sites on a surface of an inspected specimen and vertical parameters of sites in a calibration subset of the set obtained by an atomic force microscope (AFM):

Calibrate an algorithm, configured to estimate a vertical parameter of a site when SEM data of the site are input thereinto, by determining free parameters of the algorithm, such that residuals between the algorithm-estimated vertical parameters and the AFM-measured vertical parameters are about minimized.

Use the calibrated algorithm to estimate vertical parameters of the sites in the complement to the calibration subset, thereby obtaining a topographical map of the surface of the sample.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE DRAWINGS

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures:

FIG. 1A schematically depicts a region of patterned wafer including fins and trenches, according to some embodiments;

FIG. 1B schematically depicts a SEM image of the region of the patterned wafer of FIG. 1A;

FIG. 1C schematically depicts a region of patterned wafer including fins and trenches, according to some embodiments;

FIG. 3A schematically depicts a system for surface metrology of specimens, which corresponds to specific embodiments of the system of FIG. 2, and a patterned wafer undergoing profiling by the system, according to some embodiments;

FIG. 3B presents an enlarged view of a portion of the patterned wafer of FIG. 3A, according to some embodiments;

DETAILED DESCRIPTION OF THE INVENTION

Figure 2:
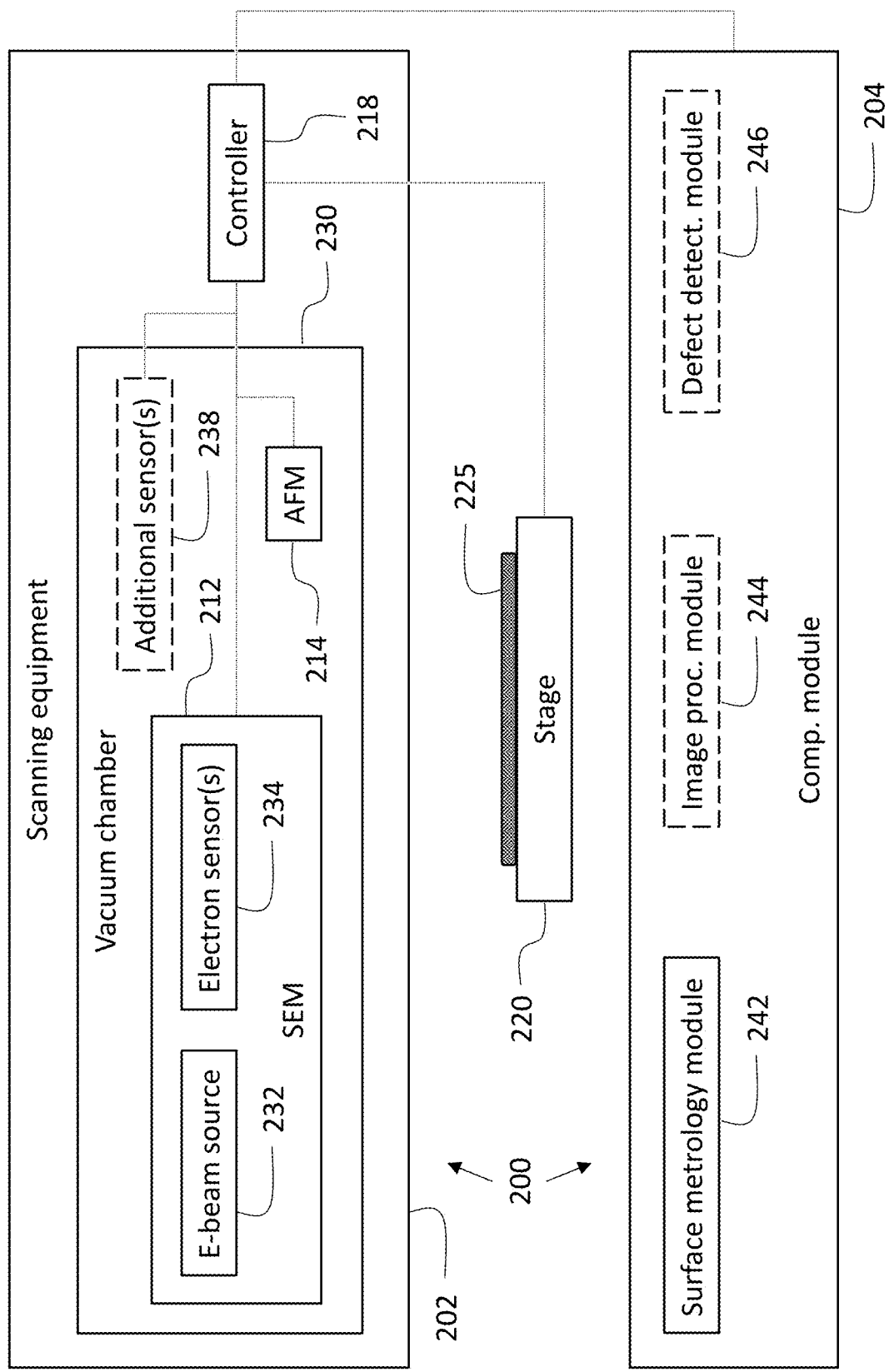
FIG. 2 presents a block diagram of a system for surface metrology of specimens, which includes a scanning electron microscope and an atomic force microscope, and a patterned wafer undergoing profiling by the system, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

According to some embodiments, an estimated quantity or estimated parameter may be said to be "about optimized" or "about optimal" when falling within 5%, 10% or even 20% of the optimal value thereof. Each possibility corresponds to separate embodiments. In particular, the expressions "about optimized" and "about optimal" also covers the case wherein the estimated quantity or estimated parameter is equal to the optimal value of the quantity or the parameter. The optimal value may in principle be obtainable using mathematical optimization software. Thus, for example, an estimated (e.g. an estimated residual) may be said to be "about minimized" or "about minimum", when the value thereof is no greater than 101%, 105%, 110%, or 120% (or some other predefined threshold percentage) of the optimal value of the quantity. Each possibility corresponds to separate embodiments.

For ease of description, in some of the figures a three-dimensional cartesian coordinate system (with orthogonal axes x, y, and z) is introduced. It is noted that the orientation of the coordinate system relative to a depicted object may vary from one figure to another. Further, the symbol ⊙ may be used to represent an axis pointing "out of the page", while the symbol ⊗ may be used to represent an axis pointing "into the page".

In block diagrams and flowcharts, optional elements and operations, respectively, may appear within boxes delineated by a dashed line. Further, in block diagrams, functional association and/or communicational association (whether one-way or two-way) between two elements may be denoted by a dotted line connecting the two elements.

As used herein, a non-flat surface, whether smooth or angled (such as the surface of a polytope), may be referred to as a "three-dimensional surface". Similarly, metrology of non-flat surfaces may be referred to as "three-dimensional surface metrology".

One of the main challenges in process control of patterned wafers is metrology of structures including non-flat surfaces. Precise and efficient probing of the vertical dimension of structures (e.g. the height or elevation of a fin, the depth of a trench) is especially challenging: On the one hand, current scanning electron microscopes (SEMs) and optical-based tools, while fast, do not afford the accuracy, which may be required to profile the topography of state-of-the-art wafers. On the other hand, "direct" tools, such as atomic force microscopes (AFMs) and transmission electron microscopes (TEMs), are too slow (moreover, TEM-based metrology is destructive).

The present disclosure provides a unified scanning electron and atomic force microscopy approach, which leverages the advantages of each. In particular, the disclosed methods and systems enable three-dimensional surface metrology, which combines the rapidity of scanning electron microscopy with the accuracy of atomic force microscopy. This is achieved by using AFM-readings from a small sample of sites on an inspected specimen to calibrate the SEM images.

FIGS. 1A-1C are intended to illustrate challenges associated with metrology based on scanning electron microscopy. FIG. 1A schematically depicts a cross-section of a region 111a on a patterned wafer 101a. Region 111a includes fins 117a and trenches 119a, which extend between fins 117a. A vertical coordinate, or height, of fins 117a is indicated by double-headed arrow h. FIG. 1B schematically depicts a SEM image 121a of region 111a. Each of the bright stripes (stripes 127a) in SEM image 121a corresponds to one of fins 117a, respectively. Each of the dark stripes (stripes 129a) corresponds to one of trenches 119a, respectively, wherefrom comparatively less electrons will be returned (in a direction substantially oppositely to the projection direction of the e-beam) than from the fins. For example, a stripe 129a' (from stripes 129a) corresponds to a trench 119a' (from trenches 119a), and stripes 127a1 and 127a2 correspond to fins 117a1 and 117a2, respectively. FIG. 1C schematically depicts a cross-section of a region 111c on a patterned wafer 101c. Region 111c includes fins 117c and trenches 119c, which extend between fins 117c. Fins 117c are slightly taller than fins 117a but are otherwise similarly shaped and spaced-apart. A vertical coordinate, or height, of fins 117c is indicated by double-headed arrow h'>h. In and of itself, SEM image 121a does not contain sufficient information to allow attributing its source to region 111a or region 111c (when h'-h is sufficiently small), let alone to allow accurately determining the height h.

Systems

According to an aspect of some embodiments, there is provided a computerized system for metrology of surfaces of specimens (e.g. semiconductor specimens). FIG. 2 presents a block diagram of such a system, a computerized system 200, according to some embodiments. System 200 includes scanning equipment 202 and a computational module 204, which may be communicatively associated with scanning equipment 202. Scanning equipment 202 may include a SEM 212, an AFM 214, and a controller 218. According to some embodiments, scanning equipment 202 may further include a stage 220 (e.g. a xyz stage) configured to accommodate an inspected specimen 225 (e.g. a patterned wafer). It is noted that specimen 225 does not form part of system 200.

SEM 212 includes an electron beam (e-beam) source 232 and an electron sensor(s) 234. Electron sensor(s) 234 may be configured to sense secondary electrons and/or backscattered electrons produced as a result of the striking of an e-beam (generated by e-beam source 232) on specimen 225. Additional elements of SEM 212, such as an electrostatic lens(es) and a magnetic deflector(s), which may be used to guide and manipulate the e-beam, are not shown. According to some embodiments, SEM 212 may include an additional sensor(s) 238. According to some embodiments, additional sensor(s) 238 may include one or more optical sensors configured to sense X-ray radiation and/or cathodoluminescent light produced as result of the striking of the e-beam on specimen 225. Additionally, or alternatively, additional sensor(s) 238 may include an electrical sensor configured to measure an absorbed current signal produced as a result of the striking of the e-beam on specimen 225.

According to some such embodiments, SEM 212, or at least e-beam source 232 and electron sensor(s) 234, and AFM 214 may be housed within a vacuum chamber 230. According to some alternative embodiments, not shown in FIG. 2, SEM 212 and AFM 214 may be housed within two different vacuum chambers, respectively (in which case specimen 225 will have to be transferred there between and each of the vacuum chambers will house a respective stage). While in FIG. 2 additional sensor(s) 238 are shown as being positioned inside vacuum chamber 230, according to some alternative embodiments, one or more of additional sensor(s) 238 (such as an optical sensor in embodiments wherein additional sensor(s) include an optical sensor, e.g. an X-ray sensor) may be positioned outside vacuum chamber 230.

Controller 218 may be functionally associated with SEM 212 and AFM 214, as well as with computational module 204. Controller 218 may be further functionally associated with stage 220. More specifically, controller 218 is configured to control and synchronize operations and functions of the above-listed modules and components during scanning of an inspected specimen. For example, according to some embodiments, wherein stage 220 is movable, stage 220 may be configured to mechanically translate an inspected specimen (e.g. specimen 225), placed thereon, along a trajectory set by controller 218, which also controls SEM 212 and AFM 214.

Computational module 204 may include computer hardware (one or more processors, and a RAM, as well as non-volatile memory components; not shown). The computer hardware is configured to process data, obtained by scanning equipment 202, so as to at least provide a topographic map of a plurality of sites on an inspected specimen as described below in this subsection below, as well as in the description of FIGS. 4A and 4B in the Methods subsection. More specifically, computational module 204 may include at least a surface metrology module 242 and, optionally, an image processing module 244. According to some embodiments, computational module 204 may further include a defect detection module 246.

Each of modules 242, 244, and 246 may be implemented by one or more processors. According to some embodiments, each of the one or more processors may be specific to a module and independent from those of the other modules. Alternatively, according to some embodiments, one or more of the processors may be used by some or all of the modules. The above-listed modules may also include software processing modules and/or firmware processing modules. The functions of each of the above-listed modules are described below.

According to some embodiments, in operation, SEM 212 collects measurement data from a set of sites on specimen 225 or one or more regions thereof. The measurement data may include at least SEM images corresponding to each of the sites and formed by secondary electrons and/or backscattered electrons produced as a result of the impingement of e-beams (generated by e-beam source 232) on the sites. Sites in a (calibration) subset of the set of sites are additionally probed by AFM 214 to obtain one or more vertical coordinates thereof (e.g. of a single location within a site or two or more locations within a site). According to some embodiments, the sites in the calibration subset constitute a small sample of the totality of sites. As non-limiting examples, the number of sites in the calibration subset may constitute about 3%, about 2%, or even about 1% of the total number of sites. Each possibility corresponds to separate embodiments. Thus, according to some embodiments, in and of itself, the AFM probing does not form a bottleneck in the process control.

As used herein, the term "calibration subset" refers to a subset of the set of sites, which includes sites (also referred to as "calibration sites") that are to be used to calibrate the SEM images, as described below.

According to some embodiments, wherein scanning equipment 202 includes additional sensor(s) 238, the SEM data may further include X-ray signals, cathodoluminescent light signals, and/or absorbed current signals.

Surface metrology module 242 is configured to execute an algorithm, which when fully specified (as explained below), is configured to output a vertical parameter of a site when SEM data, or at least SEM data, of the site are input into the algorithm. The vertical parameter may correspond to a vertical coordinate, e.g. the z-coordinate of a location in the site, or a vertical dimension of the site, e.g. the difference between the z-coordinate of a first location (e.g. the bottom of a trench) in the site and the z-coordinate of a second location (e.g. the top of a sidewall of the trench) in the site. As elaborated on below, the SEM data may be raw or processed (e.g. by image processing module 244) and include one or more SEM images, or data derived from one or more SEM images, obtained from the sensing of secondary electrons and/or backscattered electrons induced by the impingement of an e-beam on the site. According to some embodiments, the algorithm may be configured to receive as inputs other data besides SEM data, such as reference data of the site. The algorithm is predefined up to one or more free parameters (i.e. whose values prior to the calibration are not specified). According to some embodiments, and as elaborated on below, the algorithm involves computing at least a function, which is initially (prior to the calibration) defined up to the values of the one or more free parameters and fully specified after the calibration. Various forms the function may assume, according to some embodiments, are specified below in the Methods subsection in the description of FIG. 4A.

Surface metrology module 242 may include one or more processors configured to execute optimization software to determine optimal, or about optimal (e.g. to within 20%, 10%, or even 5% of the optimal value), values for the free parameters, and thus calibrate the algorithm. According to some embodiments, the optimization software may include machine learning software and/or an artificial neural network (ANN) algorithm(s). According to some embodiments, the calibrated algorithm is said to be optimal, or about optimal, in the sense of outputting—at least on average, with the average being taken over the sites in the calibration subset—vertical parameters, such that residuals of the vertical parameters are minimized, or about minimized. The residuals are obtained by taking the differences between the outputs (of the algorithm) and actual (i.e. AFM-measured) vertical parameters, respectively, of the sites in the calibration subset, as measured by AFM 214. According to some embodiments, surface metrology module 242 may be configured to minimize, or about minimize, the residuals using regression analysis.

According to some embodiments, when the obtained residuals are not to within a required precision, surface metrology module 242 may be configured to: (i) update the calibration subset by adding one or more extra sites from the set of sites to the calibration subset, and (ii) communicate to controller 218 to instruct AFM 214 to measure the vertical parameters of the one or more extra sites.

Figure 4A:
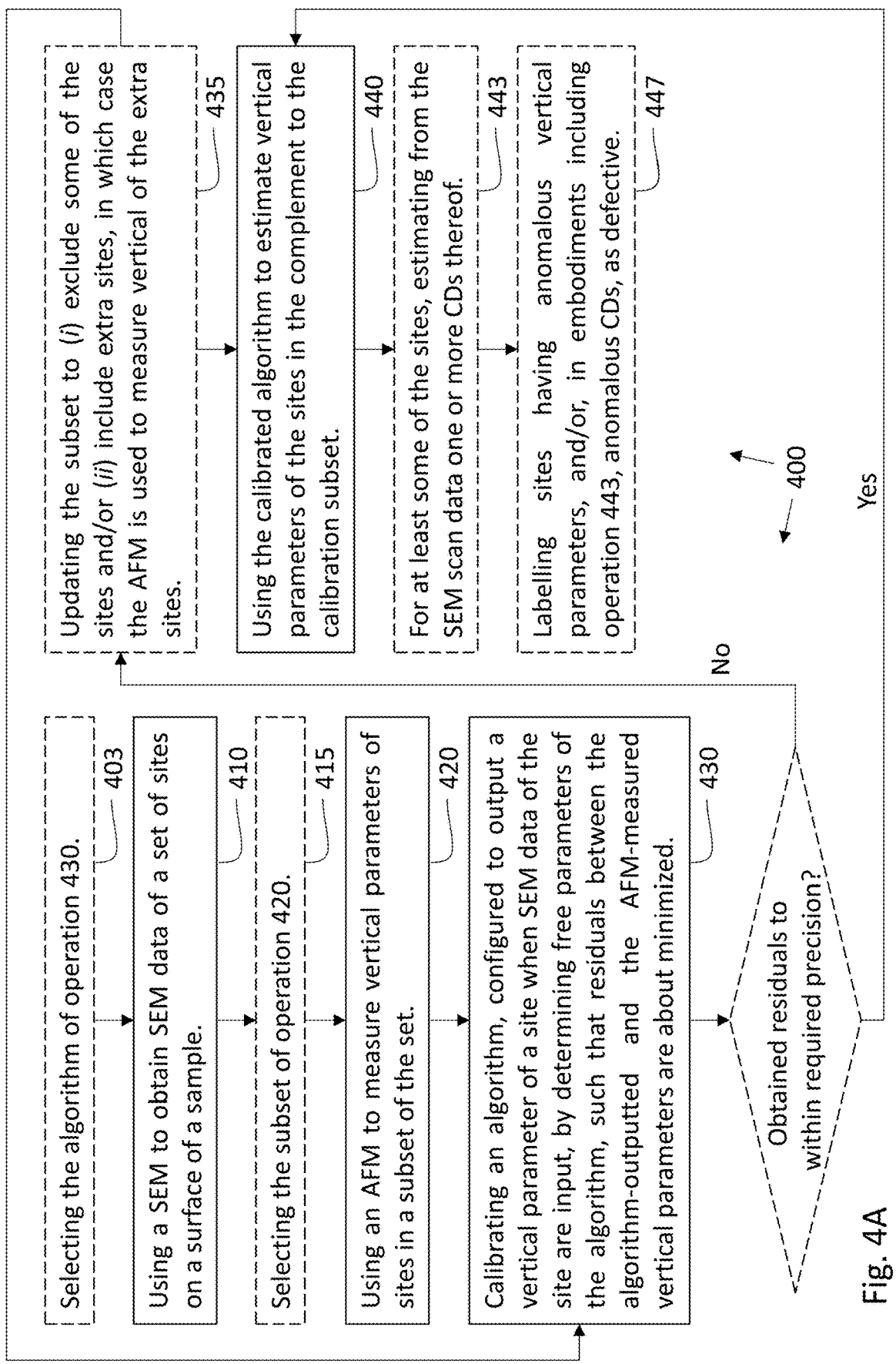
FIG. 4A presents a flowchart of a method for surface metrology of specimens combining scanning electron microscope and atomic force microscope measurements, according to some embodiments.

According to some embodiments, and as explained in detail below, as well as in the Methods subsection in the description of FIGS. 4A and 4B, the updating of the calibration subset may further include exclusion of sites from the calibration subset, which have "outlying" vertical parameters in the sense that the corresponding obtained residuals exceed a threshold value.

Once the calibrated algorithm is obtained, or obtained to the required precision, the vertical parameters of each of the rest of the sites (i.e. in the complement to the calibration subset) are computed by surface metrology module 242 by inputting the SEM data of the site into the calibrated algorithm.

According to some embodiments, image processing module 244 may include one or more graphics processing units configured to extract from a raw SEM image and/or a processed SEM image one or more image parameters, such as an intensity corresponding to an area in the SEM image, a contrast between different areas in the SEM image (e.g. a ratio of intensities) and/or a distance and/or angle therebetween, and/or intensity gradients corresponding to a raw SEM image and/or a processed SEM image. According to some embodiments, the image parameters may include structural features of an imaged site(s), such as, for example, critical dimensions (CDs) of the imaged site, e.g. a width of a trench, a pitch of a repetitive structural pattern, and/or a diameter of a via. According to some embodiments, wherein the inputs of the algorithm (executable by surface metrology module 242) are processed SEM data, image processing module 244 is further configured to send the extracted image parameters to surface metrology module 242.

Similarly, according to some embodiments, wherein scanning equipment 202 further includes an X-ray sensor and/or a cathodoluminescent light sensor, image processing module 244 may be configured to extract image parameters from thereby obtained X-ray images and/or cathodoluminescent light images, which may then be used as inputs to the algorithm (executable by surface metrology module 242).

According to some alternative embodiments, wherein the inputs of the algorithm are raw SEM data, image processing module 244 may be included in surface metrology module 242.

The above-described functions of surface metrology module 242, as well additional functions thereof, are expounded on below in conjunction with the description of the method of FIG. 4A.

According to some embodiments, the sites in the calibration subset may be preselected by computational module 204. According to some embodiments, the calibration subset may be selected so as to maximize, or at least increase, the efficiency and accuracy of the algorithm (executable by surface metrology module 242). To this end, according to some embodiments, sites which are less likely to exhibit significant structural anomalies and/or which are typically characterized by lower levels of noise may be selected. According to some embodiments, computational module 204 may be configured to select the calibration subset taking into account expected process variation across the specimen. In particular, in order to likely ensure substantially uniform accuracy, or at least a minimum target accuracy, of the calibrated algorithm across the range of process variation, according to some embodiments, sites, which are expected to differ significantly due to process variation, may be included in the calibration subset.

According to some embodiments, computational module 204 may be configured to select the calibration subset taking into account past successful selections of calibration subsets for specimens of the same batch and/or design as the inspected specimen, and/or specimens similar thereto. According to some embodiments, computational module 204 may be configured to select the calibration subset taking into account reference data of the specimen (e.g. design data of the sites).

According to some embodiments, the calibration subset may be selected taking into account SEM data of each of the sites. According to some such embodiments, sites, whose SEM images indicate at deviations from intended design, may be selected for the calibration subset, so as to likely ensure that the applicability of the calibrated algorithm is sufficiently broad and that a minimum target accuracy of the calibrated algorithm is maintained with respect to sites characterized by anomalous dimensions. Similarly, sites, whose SEM images are characterized by an image parameter (e.g. grey level value, contrast), which is at the top end or bottom end of a respective scale characterizing the totality of SEM images, may be selected. According to some embodiments, the calibration subset may be selected taking into account expected and/or known SEM drifts. In particular, in order to likely ensure substantially uniform accuracy, or at least a minimum target accuracy, of the calibrated algorithm across the range of SEM drifts, according to some embodiments, sites, whose SEM images are obtained under minimum (or without) SEM drift and under significant (or maximum) SEM drift, respectively, may be included in the calibration sub set.

According to some embodiments, the calibration subset may be selected to include sites characterized by extremal properties, such as sites including deepest, or near deepest, trenches, and/or, as mentioned above, sites whose images are characterized by highest gray level values, lowest gray level values, the greatest contrast, or the lowest contrast. According to some embodiments, the calibration subset may be selected to include sites whose profiling is challenging, in the sense that the confidence level associated with the profiling thereof is expected to be comparatively low (and not because of structural anomalies).

According to some embodiments, the calibration sub set may be selected such that the specimen is uniformly, or substantially uniformly, profiled in the sense that different regions thereon are profiled to the same, or substantially the same, confidence level.

According to some embodiments, the sites in the calibration subset may be iteratively selected by surface metrology module 242 as follows: An initial plurality of calibration sites may be selected as described above. Each calibration site in the initial plurality of calibration sites is subjected to AFM probing (and scanned by the SEM unless already having been scanned thereby) and vertical coordinates thereof are estimated, as described above. Candidate sites for enlarging the calibration subset are then identified, e.g. according to the criteria listed above (i.e. for the selection of sites to the calibration subset) and below in the descriptions of FIGS. 4A and 4B. Each candidate site may then be assigned a score specifying which of the candidate sites is or are to be probed in a first iteration. In the first iteration, one or more of the candidate sites, having the highest scores, are at least provisionally (i.e. temporarily) added to the calibration subset, and are probed by the AFM (and scanned by the SEM unless already having been scanned thereby). Following the first iteration, the remaining candidate sites (i.e. the candidate sites which have not been probed by the AFM) are rescored, taking into account the calibrated algorithm (e.g. the values of the obtained residuals). In a second iteration, one or more of the remaining candidate sites, having the highest scores, are probed by the AFM and scanned by the SEM unless already having been scanned thereby). Each subsequent iteration may involve rescoring of the remaining candidate sites taking into account the latest calibration of the algorithm. Following the first iteration, iterations may be continued being performed until a stopping criterion is reached, e.g. the free parameters of the algorithm have been determined to a required precision, or a prespecified number of iterations have been performed, or when one of the two previous conditions is first satisfied. According to some embodiments, the stopping criterion is first applied following a prefixed number of iterations, which is greater than, or equal to, two. According to some embodiments, following each iteration, or at least latter iterations, candidate sites having outlying residuals may be removed from the calibration subset.

It is noted that when the calibration subset is iteratively selected, in order to expedite the profiling, an embodiment of system 200, which includes the SEM and the AFM within the same vacuum chamber, may preferably be used (so as to avoid having to transfer the specimen back and forth between two vacuum chambers).

According to some embodiments, including defect detection module 246, defect detection module 246 may be configured to identify potentially defective sites (in both the calibration subset and the complement) based on data received from surface metrology module 242 and/or image processing module 244. According to some embodiments, sites characterized by anomalous, or sufficiently anomalous, CDs (whether lateral or vertical) may be classified as potentially defective.

According to some embodiments, e-beam source 232 may be configured to allow projecting the e-beam at any one of a plurality of incidence angles relative to specimen 225. In particular, according to some such embodiments, e-beam source 232 may be configured to allow projecting the e-beam not just perpendicularly to specimen 225 (i.e. at an incidence angle of 0°) but also obliquely relative thereto. According to some embodiments, scanning equipment 202 may be configured to obtain SEM images of at least some of the sites at two or more incidence angles. In such embodiments, the algorithm (executable by surface metrology module 242) may be configured to compute the vertical parameter(s) of such scanned sites based on SEM data from the two or more incidence angles.

According to some embodiments, electron sensor(s) 234 may be translatable and/or orientable such as to allow sensing secondary and/or backscattered electrons returned from specimen 225 at any one of a plurality of (return) angles.

FIG. 3A schematically depicts a computerized system 300 and an inspected specimen 325, which is being profiled (i.e. undergoing three-dimensional surface metrology) by system 300, according to some embodiments. System 300 corresponds to specific embodiments of system 200. Specimen 325 corresponds to specific embodiments of specimen 225. It is noted that specimen 325 does not form part of system 300. According to some embodiments, and as depicted in FIGS. 3A and 3B, specimen 325 is a patterned wafer. According to some embodiments, system 300 includes scanning equipment 302 and a computational module 304, which correspond to specific embodiments of scanning equipment 202 and computational module 204, respectively.

Scanning equipment 302 includes a SEM 312, an AFM 314, and a controller 318, which correspond to specific embodiments of SEM 212, AFM 214, and controller 218, respectively. Only a cantilever 362 and a tip (e.g. needle) 364 of AFM 314 are shown in FIG. 3A. Other components of AFM 314—such as, according to some embodiments, a piezoelectric assembly configured to maneuver the tip, and a laser source and a photodetector to measure deflections of the tip—are not shown.

Computational module 304 includes a surface metrology module, and, optionally, an image processing module (not shown), which correspond to specific embodiments of surface metrology module 242 and image processing module 244, respectively. According to some embodiments, computational module 304 may further include a defect detection module, which corresponds to specific embodiments of defect detection module 246.

System 300 further includes a stage 320, a vacuum chamber 330, an e-beam source 332, and an electron sensor 334, which correspond to specific embodiments of stage 220, vacuum chamber 230, e-beam source 232, and electron sensor(s) 234, respectively. Stage 320 has mounted thereon specimen 325. Specimen 325 includes a surface portion 327 disposed (overlaid) on a base portion 329.

According to some embodiments, SEM 312 may include additional sensor(s) 338, which correspond to specific embodiments of additional sensor(s) 238.

In operation, e-beam source 332 produces an e-beam 333 directed at surface portion 327. The striking of e-beam 333 on surface portion 327 results in the generation of secondary electrons and backscattered electrons. Secondary and/or backscattered electrons, which are returned in the direction of electron sensor 334, as indicated by arrows 337, are sensed by electron sensor 334, thus obtaining a SEM image of the site.

According to some embodiments, AFM data may be obtained simultaneously to SEM data. That is, AFM 314 may be employed simultaneously to SEM 312, such that when AFM 314 probes a calibration site, SEM 312 probes a plurality of other sites (in the complement and, optionally, the calibration subset).

Also depicted in FIG. 3A is a three-dimensional cartesian coordinate system oriented such that the z-axis is normal (i.e. perpendicular) to surface portion 327. The z-axis may be used to parameterize the vertical coordinates.

While in FIG. 3A the incidence angle of e-beam 333 is shown directed normally to surface portion 327 (so that the incidence angle is 0°), according to some embodiments, e-beam source 332 may be configured to allow projecting the e-beam at any of one or more additional incidence angles. According to some embodiments, electron sensor 334 may be translatable and/or orientable such as to allow sensing secondary and/or backscattered electrons returned from specimen 325 at any one of a plurality of return angles.

Referring also to FIG. 3B, FIG. 3B presents an enlarged view of a part of specimen 325, according to some embodiments. As a non-limiting example, surface portion 327 is shown as including fins 343 and trenches 345. Each of trenches 345 extends between a respective pair of fins (from fins 343). For instance, a trench 345' extends between a first fin 343a' and a second fin 343b'. A site 351' includes trench 345' and fins 343a' and 343b'. According to some embodiments, a vertical coordinate, or elevation, of site 351' may be defined by a bottom 347' of trench 345'. As a non-limiting example, in FIG. 3B, site 351' is depressed relative to sites adjacent thereto in the sense of bottom 347' being lower than the bottoms of the adjacent sites (as indicated by a straight line B, which is perpendicular to the vertical direction).

A depth of trench 345' is indicated by a double-headed arrow d. A width of trench 345' is indicated by a double-headed arrow w. A double-headed arrow p indicates a distance between the centers of first fin 343a' and second fin 343b', that is, the pitch of fins 343 (in embodiments wherein fins 343 are designed to be equally spaced).

According to some embodiments, wherein site 351' is selected as one of the calibration sites (i.e. to be in the calibration subset), a vertical coordinate of site 351' may be measured by AFM 314 by probing with tip 364 bottom 347', or at least a central location 361' on bottom 347'.

According to some embodiments, multiple locations per calibration site may be probed by AFM 314 (so that vertical coordinates of two or more locations per calibration site are measured by AFM 314). For example, a top 363a' of first fin 343a' (and, optionally, also a top of second fin 343b') may also be probed. According to some such embodiments, the vertical coordinates of each of the locations in a calibration site are taken into account when calibrating the algorithm (executable by the surface metrology module of computational module 304). In the context of the above example, taking into account the vertical coordinates of both top 363a' and bottom 347', or at least the difference therebetween, may potentially facilitate extracting the depth of a trench from a corresponding SEM image, and, in particular, facilitate extracting from the ratio of gray level values associated with the fin and the trench, respectively, the depth of the trench.

According to some embodiments, lateral CDs of a site, such as the width w and/or the distance p, may be extracted (potentially up to an overall normalization constant, which depends on the vertical coordinate of the site) by the image processing module of computational module 304 from a SEM image of the site. According to some such embodiments, when the site is a calibration site, the extracted CDs may be used to facilitate the calibration of the algorithm (executable by the surface metrology module). Additionally, or alternatively, according to some embodiments, when the site is not a calibration site, the extracted CDs may be used as inputs to the algorithm, to obtain a vertical parameter of the site.

Methods

According to an aspect of some embodiments, there is provided a computerized method for metrology of surfaces of specimens. FIG. 4A presents a flowchart of such a method, a method 400, according to some embodiments. Method 400 may be implemented using any one of systems 200 and 300 or a system similar thereto. Method 400 may include:

An operation 410, wherein a SEM (e.g. SEM 212 or 312) is used to obtain SEM data of a set of sites on a surface of an inspected specimen (e.g. specimen 225 or 325).

An operation 420, wherein an AFM (e.g. AFM 214 or 314) is used to measure vertical parameters of sites in a (calibration) subset of the set.

An operation 430, wherein an algorithm—configured to estimate a vertical parameter of a site when SEM data of the site are input thereinto—is calibrated by determining free parameters of the algorithm (e.g. using surface metrology module 242), such that residuals between the algorithm-estimated vertical parameters and the AFM-measured vertical parameters (i.e. the actual vertical parameters) are about minimized.

Optionally, an operation 435, contingent on the obtained residuals not being to within a required precision, wherein, the calibration subset is updated to (i) exclude some of the sites, in which case operation 430 is repeated, or (ii) include extra sites—and, optionally, exclude some of the sites—in which case the AFM is used to measure vertical parameters of the extra sites, following which operation 430 is repeated.

An operation 440, wherein the calibrated algorithm is used to estimate vertical parameters of the sites in the complement to the calibration subset (e.g. using surface metrology module 242).

The skilled person will readily perceive that the order in which the above operations are listed is not unique. In particular, other applicable orders are also covered by the present disclosure. For example, according to some embodiments, operation 420 may be performed prior to operation 410. Or, for example, according to some embodiments, operation 410 may be double phased: In a first suboperation of operation 410, which may be performed prior to, or after, operation 420, only, or substantially only, SEM data of the calibration sites are obtained. In a second suboperation of operation 410, performed after operation 430, SEM data of the remaining sites are obtained. As yet another example, according to some embodiments and as described below in the description of FIG. 4B, wherein operations corresponding to specific embodiments of optional operations 415 (described below) 435 are included, specific embodiments of operations 415, 420, 430, and 435 are "mixed" (and not listed separately).

As used herein, the terms "SEM data", "SEM scan data", and "SEM-obtained data" are used in a broad manner to cover not only SEM images, and data derived therefrom, but any data obtained from measuring one or more signals resulting from the irradiation of an inspected specimen by an e-beam generated by the SEM. Thus, according to some embodiments, the terms "SEM data", "SEM scan data", and "SEM-obtained data" are to be understood as covering also signals associated with X-rays, cathodoluminescent light, and/or an absorbed current in the inspected specimen, produced as a result of the irradiation of the inspected specimen by the e-beam.

According to some embodiments, the algorithm of operations 430 and 440 may involve respectively determining and computing a function H(S), which is initially (i.e. at the start of operation 430) specified up to the values of the one or more free parameters of the function. The values of the one or more free parameters of h(S) are determined in operation 430 (thereby calibrating the algorithm).

The function H(S) provides an estimate of a vertical parameter of a site (e.g. the height of the site relative to some baseline) $S=\{s_i\}_{i=1}^n$ is a set of parameters, which includes SEM-obtained data of a site. Each of the $s_i$ may correspond to raw SEM data (e.g. a gray level value) or processed SEM data (e.g. a ratio of grey level values from the same SEM image). In the latter case, the algorithm may involve processing of raw SEM data prior to computing the function. According to some embodiments, S includes at least a pair of intensities $I_{max}$ and $I_{min}$. $I_{max}$ and $I_{min}$ are intensities corresponding to a maximum brightness area(s) and minimum brightness (i.e. maximum darkness) area(s), respectively, in a SEM image of the site. For instance, when the site includes a trench (e.g. trench 119a'), $I_{min}$ may be the intensity of the stripe (e.g. stripe 129a'), corresponding to the trench, in the SEM image of the site (e.g. SEM image 121a), and $I_{max}$ may be the mean of the intensities of the stripes (e.g. stripes 127a1 and 127a2), corresponding to the two fins (e.g. fins 117a1 and 117a2). adjacent to the trench, in the SEM image of the site. Or, for instance, when the site includes a via (i.e. hole), $I_{min}$ may be the intensity of the spot corresponding to the via, in the SEM image of the site, and $I_{max}$ may be the mean of an annular area around the via, in the SEM image of the site. According to some embodiments, H=H(R), wherein $R=I_{max}/I_{min}$.

The algorithm and, in particular, the form of H(S), may be predetermined. According to some embodiments, machine learning tools may be employed, or additionally employed, to determine the form of H(S). By the form of H(S) what is meant is the type of function—e.g. linear, square, third-order polynomial, or even non-polynomial—as well as the values of any non-free (i.e. having a fixed value) parameters of H(S). According to some embodiments, the algorithm may be preselected from a database of algorithms based on one or more of design data of the inspected specimen (e.g. a patterned wafer), and parameters characterizing the setup, such as parameters characterizing the SEM (e.g. the average landing of the e-beam, the width thereof).

As a non-limiting example, according to some embodiments, the function may be linear function of R, i.e. have the form $a \cdot R + b$. Here a and b are the free parameters (whose values are determined in operation 430). As another non-limiting example, according to some embodiments, the function may be a square function of R, i.e. have the form $c_1 \cdot R^2 + c_2 \cdot R + c_3$. Here $c_1$, $c_2$, and $c_3$ are the free parameters (whose values are determined in operation 430).

As used herein, the term "free parameter" is used to refer to a parameter whose value is not fully fixed. Thus, for example, a parameter whose value is restricted to within a range is also a free parameter. According to some embodiments, the values of at least some of the free parameters are prespecified (i.e. at the beginning of operation 430) to within respective ranges. According to some embodiments, the prespecified ranges may be determined based at least on reference data of the inspected specimen or at least structures, which are to be profiled on the inspected specimen. According to some embodiments, the prespecifying of ranges may expedite the determination of the free parameters and/or improve the calibration (e.g. by helping to avoid outputting a solution corresponding to a local minimum, which is not global, when the minimization is non-convex).

According to some embodiments, the algorithm may be a deep neural network (DNN) with the free parameters of the algorithm constituting weights of the DNN. The DNN is configured to receive as inputs the set of parameters S.

According to some embodiments, the values of the free parameters may be obtained using machine-learning tools, such as regression analysis.

According to some embodiments, the values of the free parameters may be obtained using trend analysis, wherein SEM data and AFM data of some of the calibration sites (e.g.

about 70%) are used to estimate the values of the free parameters of the algorithm, and the SEM data and the AFM data of the remaining calibration sites are used for verification, i.e. to test the accuracy of the estimated values.

According to some embodiments, the SEM-obtained data associated with a site may also include SEM data of sites neighboring the site.

According to some embodiments, the SEM data of a site may include a plurality of SEM images of the site, or data extracted from a plurality of SEM images of the site. According to some such embodiments, the plurality of SEM images may include SEM images obtained at different incidence angles of the e-beam.

More generally, the function H may depend not only on S but on additional parameters, which do not correspond to SEM-obtained data, such as reference data of the calibrated sites. This may be the case when sites designed to have different structures are to be profiled. Alternatively, for example, when all sites to be profiled are manufactured to the same design, dependence on reference data (particularly, design data) may be relegated to (dependence on the design data of) the free parameters.

According to some embodiments, the number of free parameters of the algorithm is smaller than, or equal to, the number of sites in the calibration subset.

According to some embodiments, method 400 may further include, subsequently to operation 430, checking whether the obtained (i.e. the about minimized) residuals are to within a required precision, and, when not, proceeding to operation 435.

According to some embodiments, when either of (i) a first condition that the absolute values of the obtained residuals are smaller than a first threshold value (or a respective first threshold value), and (ii) a second condition that a value of a precision function of the obtained residuals is smaller than a second threshold value, the obtained residuals are within a required precision. As a non-limiting example, the precision function may be the sum of the squares of the residuals (or the root thereof).

According to some embodiments, when the sites in the calibration subset can be divided into a first group and a second group, such that the first group includes a percentage of the sites, with the percentage being above a first threshold percentage, and such that either of (i') a first condition that each of the obtained residuals in the first group is smaller than a first threshold value (or a respective first threshold value), and (ii') a second condition that a value of a precision function of the obtained residuals in the first group is smaller than a second threshold value, the obtained residuals are within a required precision. According to some embodiments, when the obtained residuals are to within the required precision, the calibration subset is updated to exclude the sites (if present) in the second group. According to some embodiments, the first threshold percentage may be equal to or greater than 80%, 90%, or 95%. Each possibility corresponds to different embodiments.

According to some embodiments, in operation 420 vertical parameters of two or more locations in a site may be measured. For example, when the site includes a trench between two fins, the vertical parameter of the site (e.g. the depth thereof) may be derived from the vertical coordinate of the trench and the vertical coordinates of the two fins, or, alternatively, the three vertical coordinates may constitute three vertical parameters corresponding to the site.

Optionally, according to some embodiments, method 400 may further include an initial operation 403 (i.e. prior to operation 410), wherein the algorithm is selected. According to some embodiments, the algorithm may be selected taking into account reference data of the inspected specimen, such as data obtained from profiling other specimens (e.g. specimens manufactured to the same design) and/or design data of the inspected specimen. According to some embodiments, the algorithm may be selected taking into account the precision to which the vertical parameters of the sites are to be estimated: When the required precision is comparatively high, a more accurate but more cumbersome algorithm may be selected, whereas, when the required precision is comparatively low, a less accurate but less cumbersome algorithm (e.g. faster and/or consuming less memory) may be selected. According to some embodiments, the algorithm may be selected from a predefined list of algorithms. According to some embodiments, the selection of the algorithms includes selection of the form of the function H(S). Thus, as a non-limiting example, according to some embodiments, when higher precision is required, the selected form may be an n-degree polynomial, wherein $n \geq 2$, whereas when lower precision is required, the form may be a m-degree polynomial, wherein $1 \leq m \leq n-1$. According to some embodiments, the form of the function may be selected from a predefined list of forms.

As used herein, the term "reference data" should be expansively construed to cover any data indicative of the physical design of an inspected specimen (e.g. a patterned wafer). According to some embodiments, the reference data of an inspected specimen may include "design data" of the inspected specimen, such as, for example, the various formats of CAD data. According to some embodiments, the reference data may include data obtained by simulation. According to some embodiments, reference data of an inspected specimen may include data obtained by profiling one or more specimens fabricated to the same design as the inspected specimen or to similar design. The profiling may include subjecting at least some of the specimens to the three-dimensional surface metrology methods disclosed herein. Additionally, or alternatively, the profiling may involve destructive probing techniques, such as when an inspected specimen is cut up into lamellas, whose structure may then be characterized to high precision using, for example, a TEM.

Optionally, according to some embodiments, method 400 may further include an operation 415 (which may be subsequent to operation 410), wherein the calibration subset is determined (i.e. the calibration sites are selected). The calibration sites may be selected, so as to likely maximize the amount of useful information—as pertains to the calibration of the algorithm—derivable from the probing of the calibration sites by the AFM, while maintaining the number of calibration sites small. What constitutes useful information may depend on the (intended) design of the specimen, whether all of the specimen is to be profiled or only some regions thereof, and/or whether all regions to be profiled are to be profiled to the same accuracy. More specifically, according to some embodiments, the sites in the calibration subset may be selected so as to maximize, or at least increase, the efficiency and accuracy of the algorithm. To this end, according to some embodiments, sites which are less likely a site to exhibit structural anomalies, or at least significant structural anomalies, and which are typically characterized by lower levels of noise, may be selected. Preferably, the selected sites may display variability in the measurements (i.e. dimensions) thereof—and, according to some embodiments, in the shapes thereof—to help ensure that the calibrated algorithm work well with respect to the full variety of profiled sites. In particular, the selected sites may include extremal sites, such as sites including the deepest, or near deepest, trenches, sites positioned at the edge of wafer (when the specimen is a wafer), and/or sites whose SEM images are characterized by extremal gray level values (e.g. lowest or highest), or by the greatest or lowest contrasts. More generally, according to some embodiments, sites whose profiling may be challenging, in the sense that the confidence level associated with the profiling thereof is expected to be comparatively low (even when not exhibiting anomalies) may also be selected. This may help ensure that the calibrated algorithm work well not only with respect to easier-to-profile sites.

According to some embodiments, the calibration subset may be selected taking into account SEM data of each of the sites. According to some such embodiments, sites, whose SEM images indicate at deviations from intended design, may also be selected for the calibration subset, particularly when the deviations are indicative of systemic production faults (thereby allowing to characterize the faults and/or identify their source).

According to some embodiments, wherein the specimen was previously subjected to inspection by another tool(s), e.g. an optical scanning tool(s), the calibration subset may be selected taking into account data obtained by other tool(s).

According to some embodiments, the number of sites selected for the calibration subset may depend on the precision to which the vertical parameters of the sites are to be estimated: the higher the required precision, the greater the number of sites selected for the calibration subset. According to some embodiments, the calibration subset may be selected taking into account expected process variation across the specimen and/or expected and/or known SEM drifts. According to some embodiments, the calibration subset may be selected taking into account past successful selections of calibration subsets for specimens of the same batch and/or the same design, and/or specimens of similar design. According to some embodiments, machine learning tools and/or an ANN(s) may be employed to identify optimal or improved calibration subsets. According to some embodiments, the calibration subset may be selected taking into account reference data of the specimen (e.g. design data of the sites).

According to some embodiments, operation 420 may be performed simultaneously with operation 410. According to such some embodiments, operation 430—and, when included, and occurring, operation 435—may also be performed simultaneously with operation 410.

According to some embodiments, in operation 440, if a percentage of sites in the complement, above a threshold percentage, is such that for each these site a difference between the estimated vertical parameter thereof and an expected vertical parameter thereof falls outside a predetermined range, then the calibration subset is replaced by a new calibration subset. Operation 420 is next applied with respect to all candidate sites in the new calibration subset, which have not previously been probed by the AFM, and 430 and 440 are repeated with respect to the new calibration subset.

Operation 410 may be implemented using a SEM, such as SEM 212, SEM 312, or a SEM similar thereto.

Operation 420 may be implemented using an AFM, such as AFM 214, AFM 314, or an AFM similar thereto.

The computations in operations 430 and 440 may be implemented using a computational module, such as computational module 204, 304, or a computational module similar thereto. Moreover, it to be understood that each of computational modules 204 and 304, according to some embodiments thereof, may be configured to perform all the computations involved in operations 430 and 440, as described in this subsection. According to some embodiments, in operation 430 the residuals may be minimized using surface metrology module 242, the surface metrology module of computational module 304, or a surface metrology module similar thereto. Similarly, in operation 440 the vertical parameters of the sites in the complement to the calibration subset may be estimated—based on the SEM-obtained data of the sites in the complement—using surface metrology module 242, the surface metrology module of computational module 304, or a surface metrology module similar thereto.

According to some embodiments, in operation 430 the SEM data, input into the algorithm, are processed SEM data. According to some such embodiments, raw SEM data of a site are processed to extract one or more features characterizing the site and/or the raw SEM image thereof, such as CDs of the site, and intensity gradients of the raw SEM image. According to some embodiments, wherein the site includes a segment of a trench between a pair of fins, the CDs may include one or more of a width of the trench and the distance between the centers of the fins, and so on. According to some embodiments, the processing of the raw SEM data may be performed using image processing module 244, the image processing module of computational module 304, or an image processing module similar thereto.

According to some embodiments, in operation 410 one or more additional sensors (e.g. additional sensor(s) 238) are used to measure one or more additional signals. According to some such embodiments, the one or more additional sensors may include one or more optical sensors configured to measure X-ray signals and/or cathodoluminescent light signals (produced as a result of the specimen being irradiated by the e-beam of the SEM), and/or an electrical current sensor configured to measure an absorbed current signal (produced as a result of the specimen being irradiated by the e-beam of the SEM). According to some embodiments, wherein in operation 410 the one or more additional sensors are used, the inputs of the algorithm (in operation 430 and/or 440) may include at least some of the one or more additional signals, optionally, after processing thereof.

According to some embodiments, wherein a batch of specimens, fabricated to the same design, is to undergo surface metrology, method 400 may be implemented with respect to each of the specimens. According to some alternative embodiments, method 400 may be implemented only with respect to a sample (e.g. a small percentage) of the specimens. As a non-limiting example, according to some embodiments, method 400 may be implemented with respect to every (k·m+1)-th specimen. Here k is an integer greater than 2. m ranges from 0 in increments of 1 (so that method 400 is implemented with respect to the first specimen, the (k+1)-th specimen, the (2k+1)-th specimen, and so on). According to some embodiments, the value of k may be determined based on the characteristic times of known SEM drifts.

In embodiments wherein operation 435 is included, surface metrology module 242, or a surface metrology module similar thereto, may be used to update the calibration subset.

Optionally, according to some embodiments, method 400 may further include an operation 443, wherein, for at least some of the sites, one or more CDs thereof are estimated from the SEM data (e.g. using image processing module 244).

Optionally, according to some embodiments, method 400 may further include an operation 447, wherein the SEM data of each of at least some of the sites (including data derived therefrom such as the vertical coordinates of a site, as computed by the calibrated algorithm) are analyzed to determine whether the respective site is defective (e.g. using defect detection module 246).

According to some embodiments, including both operation 443 and operation 447, a site having an anomalous CD, whether lateral or vertical, may be labelled as defective.

Figure 4B:
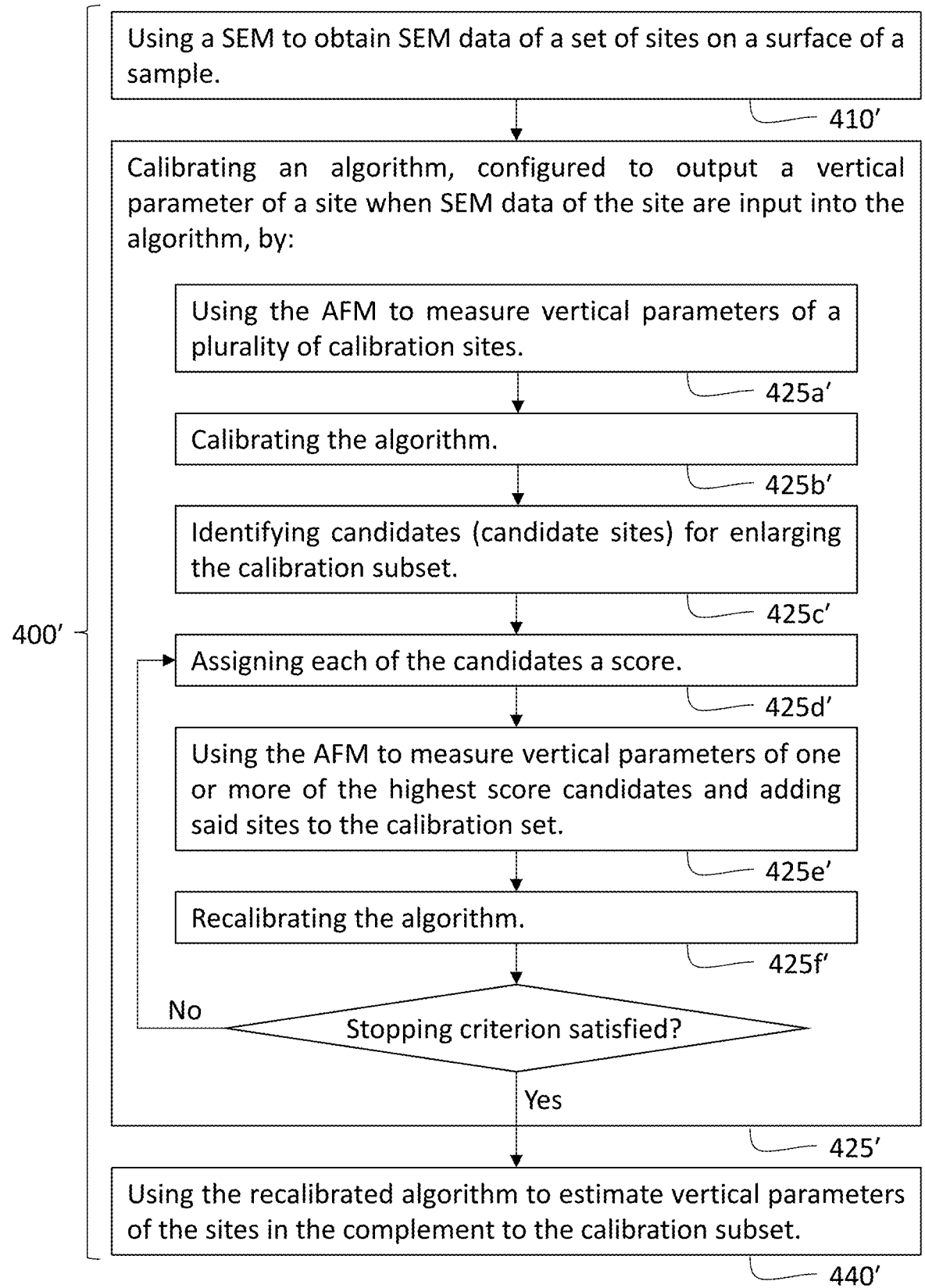
FIG. 4B presents a flowchart of a method for surface metrology of specimens combining scanning electron microscope and atomic force microscope measurements, which corresponds to specific embodiments of the method of FIG. 4A.

FIG. 4B presents a flowchart of a method 400' for metrology of surfaces of specimens, according to some embodiments. Method 400' corresponds to specific embodiments of method 400', wherein the calibration subset is iteratively selected, essentially as described above in the Systems subsection in description of FIG. 2. Method 400' includes:

- An operation 410', wherein a SEM (e.g. SEM 212 or 312) is used to obtain SEM data of a set of sites on a surface of an inspected specimen (e.g. specimen 225 or 325).
- An operation 425', wherein an algorithm—configured to estimate a vertical parameter of a site, when SEM data of the site are input thereinto—is calibrated by performing:
  - A sub operation 425a', wherein vertical parameters of an (initial) plurality of calibration sites are measured. The initial calibration sites constitute an initial calibration subset.
  - A sub operation 425b', wherein the algorithm is calibrated based on the measured vertical parameters of the plurality of calibration sites and SEM data corresponding thereto, which were obtained in operation 410'.
  - A suboperation 425c', wherein candidate sites for enlarging the calibration subset are identified.
  - A suboperation 425d', wherein each of the candidate sites is assigned a score.
  - A suboperation 425e', wherein the AFM is used to measure vertical parameters of one or more of the candidate sites having the highest scores. These (highest score) candidate sites are added to the calibration subset.
  - A suboperation 425f, wherein the algorithm is recalibrated.
  - A suboperation 425g', wherein suboperations 425d', 425e', and 425f are repeated unless a stopping criterion is satisfied.
- An operation 440', wherein the recalibrated algorithm is used to estimate vertical parameters of the sites in the complement to the subset (e.g. using surface metrology module 242).

Operations 410' and 440' may correspond to specific embodiments of operations 410 and 440, respectively, of method 400. Operation 425 may correspond to some specific embodiments, of the sequence of operations 415, 420, 430, and 435 of method 400.

In sub operation 425c' the candidate sites may be identified essentially as described above in the description of operation 415 (of method 400) and in the description of FIG. 2 in the Systems subsection. In sub operation 425d', the candidate sites may be scored according to the expected amount of additional useful information, which is expected to be obtained by the probing thereof in suboperation 425e'. That is, according to how the probing of each is expected to contribute to the recalibration of the algorithm in sub operation 425f in terms of the resulting accuracy of the algorithm.

In the second implementation of sub operation 425d' (i.e. as part of the implementation of sub operation 425g', that is, when the stopping criterion is not satisfied, so that sub operation 425g'), each of the remaining candidate sites may be rescored according to the respective amount of additional useful information, which is expected to be obtained by the probing thereof in suboperation 425e'. The rescoring may take into account (i) the measured values of the vertical parameters of the (just added) calibration sites probed in the first implementation of sub operation 425e', and (ii) the values of the corresponding residuals, obtained in the recalibration of the algorithm in the first implementation suboperation 425f. Similarly, in each subsequent implementation of sub operation 425d' (if occurring), each of the remaining candidate sites may be rescored according to the amount of useful information, which is expected to be obtained by the probing thereof in the next implementation of sub operation 425e', taking into account at least (i) the thus far measured values of the vertical parameters, and (ii) the values of the residuals, obtained in the recalibration of the algorithm in (what is at that time) the last implementation of suboperation 425f.

In sub operations 425b' the algorithm may be calibrated essentially as described above in the description of operation 430. In sub operation 425f, the algorithm is recalibrated by calibrating it again with respect to the current calibration subset.

According to some embodiments, suboperation 425d', or at least latter repetitions thereof (e.g. starting from the first repetition or starting from the second repetition), may further include exclusion (i.e. removal) from the calibration subset of calibration sites (whether from the original, i.e. initial, calibration subset or added later thereto) whose measured vertical coordinates are "outliers" in the sense that the corresponding obtained residuals exceed a threshold value.

According to some embodiments, the stopping criterion (at which operation 425' is concluded) may be triggered when the free parameters of the algorithm have been determined to a required precision, or when a prespecified number of iterations (i.e. repetitions of suboperations 425d' to 425f, or, what is the same thing, applications of sub operation 425g') have been performed, or when one of the two previous conditions is first satisfied.

Optionally, according to some embodiments, method 400' may further include an initial operation, similar to operation 403, wherein the algorithm (calibrated in operation 425') is selected.

Optionally, according to some embodiments, method 400' may further include an operation similar to operation 443 (which is performed after operation 440'). According to some such embodiments, method 400' may additionally include an operation similar to operation 447 (which may be the last operation performed).

Optionally, according to some embodiments, method 400' may further include an operation, performed after operation 440', wherein the SEM data of each of at least some of the sites are analyzed to determine whether the respective site is defective.

As used herein, the terms "SEM data", "SEM scan data", and "SEM-obtained data" may be used interchangeably.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although operations of methods, according to some embodiments, may be described in a specific sequence, the methods of the disclosure may include some or all of the described operations carried out in a different order. In particular, it is to be understood that the order of operations and suboperations of any of the described methods may be reordered unless the context clearly dictates otherwise, for example, when a latter operation requires as input the output of earlier operation or when a latter operation requires the product of an earlier operation. A method of the disclosure may include a few of the operations described or all of the operations described. No particular operation in a disclosed method is to be considered an essential operation of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications, and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A computer-based method for three-dimensional surface metrology of specimens based on scanning electron microscopy and atomic force microscopy, the method comprising operations of:
   using a scanning electron microscope (SEM) to obtain SEM data of a set of sites on a surface of an inspected specimen;
   using an atomic force microscope (AFM) to measure vertical parameters quantifying vertical coordinates and/or vertical dimensions of sites in a calibration subset of the set;
   calibrating an algorithm, configured to estimate a vertical parameter of a site when SEM data of the site are input thereinto, by determining free parameters of the algorithm, such that residuals between the algorithm-estimated vertical parameters and the AFM-measured vertical parameters are about minimized; and
   using the calibrated algorithm to estimate vertical parameters of the sites in the complement to the calibration subset.

2. The method of claim 1, wherein the obtained residuals are to within a required precision when satisfying a first condition that absolute values thereof are smaller than a first threshold value, and/or a second condition that a value of a precision function thereof is smaller than a second threshold value; and/or
   wherein the obtained residuals are to within a required precision when a percentage above a first threshold percentage of the obtained residuals satisfy at least one of a third condition that each residual in the percentage is smaller than a third threshold value, and a fourth condition that a value of a precision function of the residuals in the percentage is smaller than a fourth threshold value, and, wherein, when the third condition and/or the fourth condition is satisfied, updating the calibration subset to exclude sites therein, when present, which are not in the percentage satisfying the first and/or the second condition.

3. The method of claim 2, wherein, when the obtained residuals are not to within the required precision, performing the following extra operations:
   updating the calibration subset to further comprise one or more extra sites from the set;
   using the AFM to measure vertical parameters of the one or more extra sites; and
   performing the operation of calibrating the algorithm, additionally taking into account the measured vertical parameters of the one or more extra sites and SEM data of the one or more extra sites, and, once thereby obtained residuals are to within the required precision, proceeding to the operation of using the calibrated algorithm.

4. The method of claim 1, wherein the sites in the calibration subset are selected, and profiled by the AFM, in an iterative manner, such that data obtained in one iteration is used, in a next iteration, to improve the selection of sites, so as to improve the calibration.

5. The method of claim 1, wherein, in the operation of using the calibrated algorithm to estimate vertical parameters of the sites in the complement to the calibration subset, if a percentage above a second threshold percentage of sites in the complement is such for each site, included in the percentage of sites, a difference between the estimated vertical parameter thereof and an expected vertical parameter falls outside a predetermined range, replacing the calibration subset by a new calibration subset, using the AFM to measure vertical parameters of calibration sites in the new calibration subset, which have not previously been probed by the AFM, recalibrating the algorithm, and using the recalibrated algorithm to estimate vertical parameters of the sites in the complement to the new calibration subset.

6. The method of claim 1, wherein the calibration subset is selected taking into account expected process variation across the inspected specimen and expected and/or known SEM drifts; and/or
   wherein the calibration subset is selected taking into account past successful selections of calibration subsets at least in specimens of a same intended design as the inspected specimen and/or specimens similar thereto; and/or
   wherein the calibration subset is selected taking into account past successful selections of calibration subsets in specimens from a same batch as the inspected specimen.

7. The method of claim 1, wherein a functional form of the algorithm is selected based on the number of sites in the calibration subset and/or accuracy of the AFM measurements.

8. The method of claim 1, wherein the SEM data comprise at least secondary electron signals and/or backscattered electron signals.

9. The method of claim 1, wherein the output of the algorithm is a polynomial function of the SEM data.

10. The method of claim 1, wherein machine learning tools are used to determine the free parameters of the algorithm.

11. The method of claim 1, wherein the algorithm is a deep neural network and the free parameters comprise weights of the deep neural network.

12. The method of claim 1, wherein the calibration subset is at least about one order of magnitude smaller than the set.

13. The method of claim 1, wherein the inspected specimen is a patterned wafer, and wherein the sites comprise trenches between fins and/or wherein the sites comprise vias.

14. The method of claim 1, further comprising estimating at least from the SEM data one or more critical dimensions for each site in the set, in addition to the vertical parameters thereof, and wherein the inputs of the algorithm comprise the critical dimensions and/or one or more functions thereof.

15. A computer-based method for three-dimensional metrology of surfaces of a plurality of specimens fabricated to the same design, the method comprising operations of:
   applying the method of claim 1 to a sample of the specimens, thereby obtaining one or more calibrated algorithms, respectively;
   using a SEM to obtain SEM data of sites on surfaces on each of the rest of the specimens; and
   using the one or more calibrated algorithms to estimate vertical parameters of each of the sites in the rest of the specimens.

16. A system for three-dimensional surface metrology of specimens, the system comprising:
   scanning equipment comprising:
   a scanning electron microscope (SEM), configured to obtain SEM data of sites in a set of sites on a surface of an inspected specimen; and
   an atomic force microscope (AFM), configured to measure vertical parameters quantifying vertical coordinates and/or vertical dimensions of sites in a calibration subset of the set; and
   a computational module configured to:
   calibrate an algorithm, which is configured to estimate a vertical parameter of a site when SEM data of the site are fed into the algorithm as inputs, by determining free parameters of the algorithm, such that residuals between the algorithm-outputted vertical parameters and the AFM-measure vertical parameters are about minimized; and
   estimate vertical parameters of the sites in the complement to the calibration sub set using the calibrated algorithm;
   thereby generating a topographical map of the surface of the inspected specimen.

17. The system of claim 16, wherein the computational module is configured to check whether the obtained residuals satisfy at least one of a first condition that absolute values thereof are smaller than a first threshold value, and a second condition that a value of a precision function thereof is smaller than a second threshold value, and, if so, categorize the obtained residuals as being to within a required precision; and/or
   wherein the computational module is configured to check whether a percentage above a first threshold percentage of the obtained residuals satisfy at least one of a third condition that each residual in the percentage is smaller than a third threshold value, and a fourth condition that a value of a precision function of the residuals in the percentage is smaller than a fourth threshold value, and, if so, update the calibration subset to exclude sites therein, when present, which are not in the percentage of residuals that satisfy at least one of the third and fourth conditions.

18. The system of claim 17, further configured to, when the obtained residuals are not to within the required precision:
   update the calibration subset to further comprise one or more extra sites from the set;
   use the AFM to measure vertical parameters of the one or more extra sites; and
   recalibrate the algorithm, additionally taking into account the vertical parameters of the one or more extra sites and SEM data of the one or more extra sites, and, once thereby obtained residuals are to within the required precision, compute vertical parameters of the sites in the complement to the calibration subset using the recalibrated algorithm.

19. The system of claim 18, wherein the scanning equipment further comprises one or more optical sensors and/or an electrical current sensor;
   wherein the one or more optical sensors are configured to measure X-ray signals and/or cathodoluminescent light signals generated as a result of the inspected specimen being struck by an e-beam of the SEM; and
   wherein the electrical current sensor is configured to measure an electrical current generated in the inspected specimen as a result of the inspected specimen being irradiated by the e-beam of the SEM.

20. The system of claim 16, wherein the output of the algorithm is a polynomial function of the SEM data.

* * * * *